United States Patent
Bansal et al.

(10) Patent No.: US 6,526,272 B1
(45) Date of Patent: Feb. 25, 2003

(54) REDUCING CALLING COSTS FOR WIRELESS PHONES USING MULTIPLE MOBILE IDENTIFICATION NUMBERS

(75) Inventors: Pradeep K. Bansal, Dayton, NJ (US); Lee Begeja, Gillette, NJ (US); Jeffrey Joseph Farah, North Brunswick, NJ (US); Rajesh Kapadia, Plainsboro, NJ (US); Bernard S. Renger, New Providence, NJ (US); Benjamin J. Stern, Morris Township, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/324,733

(22) Filed: Jun. 3, 1999

(51) Int. Cl.⁷ ................................................ H04Q 7/20
(52) U.S. Cl. .................... 455/406; 455/408; 455/551
(58) Field of Search ............................. 455/406, 408, 455/414, 432, 433, 435, 551, 552, 553, 558, 566, 186.1

(56) References Cited

U.S. PATENT DOCUMENTS 5,915,214 A * 6/1999 Reece et al. ............... 455/406
6,167,250 A * 12/2000 Rahman et al. ............ 455/408

FOREIGN PATENT DOCUMENTS

| EP | 0 724 371 A | 7/1996 |
| WO | WO 98 58512 A | 12/1998 |
| WO | WO 99 16267 A | 4/1999 |

* cited by examiner

Primary Examiner—Lester G. Kincaid
(74) Attorney, Agent, or Firm—Joseph C. Redmond, Jr.; Morgan & Finnegan, LLP

(57) ABSTRACT

A system, method, and computer program product that reduces calling costs for a wireless phone through the use of multiple mobile identification numbers (MINs). The wireless phone is associated with multiple MINs, which are stored in a profile on the wireless phone network or within the wireless phone. A rate table is used to determine which MIN will incur the lowest calling costs. This MIN is selected for communications between the wireless phone and the wireless phone network.

42 Claims, 4 Drawing Sheets

REDUCING CALLING COSTS FOR WIRELESS PHONES USING MULTIPLE MOBILE IDENTIFICATION NUMBERS

BACKGROUND OF THE INVENTION

1. Field of the Invention

The present invention relates generally to wireless communications, and more particularly to using multiple mobile identification numbers to reduce calling costs for wireless phones.

2. Related Art

Wireless phones are experiencing a dramatic increase in popularity. As handset size and service costs decline, the wireless phone is rapidly becoming the phone of choice. For many users, it has displaced the conventional wireline phone completely.

However, the costs of making and receiving calls using a wireless phone can vary dramatically based on factors such as whether the call is being made through the user's home service provider or whether the phone is in "roaming" mode.

SUMMARY OF THE INVENTION

The present invention is a system, method, and computer program product that reduces calling costs for a wireless phone through the use of multiple mobile identification numbers (MINs).

According to one embodiment of the present invention, a method for use in a wireless phone network includes receiving a current mobile identification number (MIN) from a wireless phone, the wireless phone associated with a plurality of MINs including the current MIN; and selecting one of the plurality of MINs to be used for calls with the wireless phone based on the costs of completing the calls.

According to one aspect of the embodiment, the selecting step includes accessing a network-based profile associated with the current MIN, the profile including the plurality of MINs, each having a calling cost.

According to a further aspect of the embodiment, the selecting step further includes computing the calling cost for each of the plurality of MINs based on wireless calling costs.

According to a further aspect of the embodiment, the method further includes transmitting an indication of the selected MIN to the wireless phone.

According to a further aspect of the embodiment, the method further includes causing the wireless phone to register with the wireless phone network after transmitting the selected MIN.

According to a further aspect of the embodiment, the transmitting step includes transmitting the selected MIN to the wireless phone.

According to a further aspect of the embodiment, the method further includes receiving an outbound phone call from the wireless phone; and the selecting step further includes computing the cost of completing the call for each of the plurality of MINs based on wireline calling costs.

According to a further aspect of the embodiment, the call is a long-distance call, and the selecting step further includes computing the cost of completing the outbound call for each of the plurality of MINs based on long-distance calling costs.

According to a further aspect of the embodiment, the selecting step further includes computing the cost of completing an inbound call to each of the plurality of MINs based on the wireline costs of forwarding the call from a predetermined wireline number.

According to a further aspect of the embodiment, the method further includes activating call forwarding of the wireline number to the selected MIN.

According to another embodiment of the present invention, a method for use in a wireless phone includes sending a current mobile identification number (MIN) to a wireless phone network in a call service area, the wireless phone associated with a plurality of MINs; receiving an indication of a selected MIN from the wireless phone network; and using the selected MIN for calls with the wireless phone network; wherein the wireless phone network selects the selected MIN based on the costs of completing the calls.

According to one aspect of the embodiment, the receiving step includes receiving the selected MIN from the wireless phone network.

According to a further aspect of the embodiment, the method further includes registering with the wireless phone network using the selected MIN.

According to a further aspect of the embodiment, the method further includes manifesting an indication when the phone changes from one MIN to another.

According to another embodiment of the present invention, a method for use in a wireless phone includes receiving a rate table from a wireless phone network, the rate table containing calling costs for each of a plurality of mobile identification numbers (MINs) associated with the wireless phone; and selecting one of the plurality of MINs to be used for calls with the wireless phone based on the costs of completing the calls as listed in the rate table.

According to a further aspect of the embodiment, the selecting step includes computing the calling cost for each of the plurality of MINs based on wireless calling costs.

According to a further aspect of the embodiment, the method further includes registering with the wireless phone network using the selected MIN.

According to a further aspect of the embodiment, the method further includes receiving a phone number for an outbound phone call; and the selecting step further includes computing the cost of completing the call for each of the plurality of MINs based on wireline calling costs listed in the rate table.

According to a further aspect of the embodiment, wherein the outbound phone call is a long-distance call, and wherein the selecting step further includes computing the cost of completing a call for each of the plurality of MINs based on long-distance calling costs listed in the rate table.

According to a further aspect of the embodiment, wherein the selecting step further includes computing the cost of completing an inbound call to each of the plurality of MINs based on the wireline costs of forwarding the call from a predetermined wireline number.

One advantage of the present invention is that it automatically reduces calling costs for the user of a wireless phone.

Further features and advantages of the present invention as well as the structure and operation of various embodiments of the present invention are described in detail below with reference to the accompanying drawings.

BRIEF DESCRIPTION OF THE FIGURES

The present invention will be described with reference to the accompanying drawings.

DETAILED DESCRIPTION OF THE PREFERRED EMBODIMENTS

The present invention is described in terms of the above example. This is for convenience only and is not intended to limit the application of the present invention. In fact, after reading the following description, it will be apparent to one skilled in the relevant art how to implement the present invention in alternative embodiments.

The present invention is a system, method, and computer program product that reduces calling costs for a wireless phone through the use of multiple mobile identification numbers (MINs).

Figure 1:
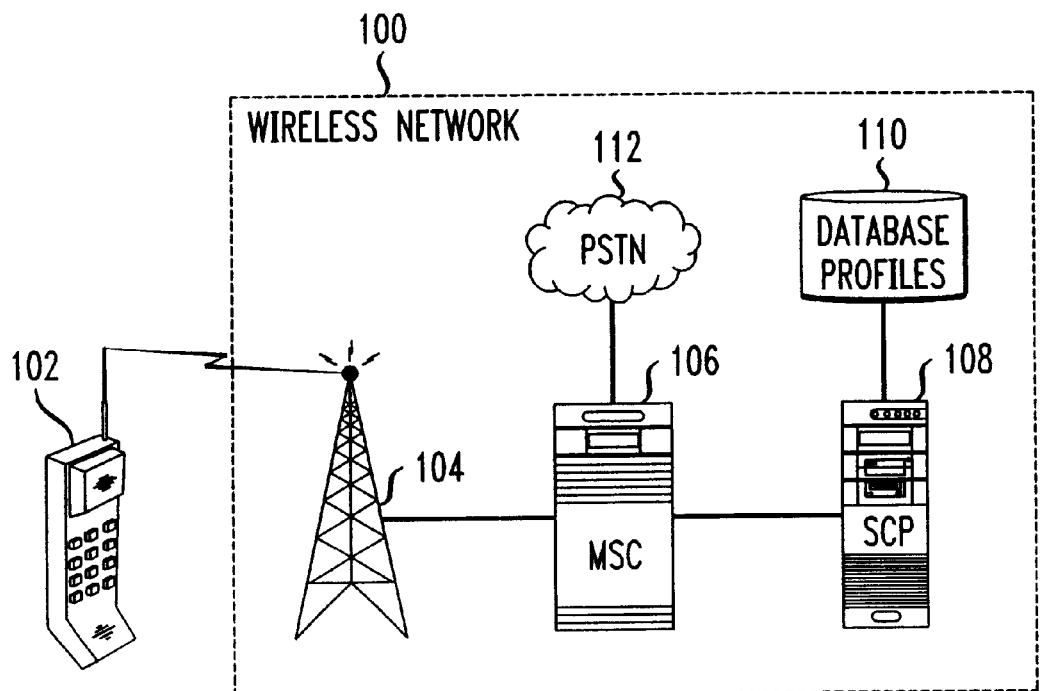
FIG. 1 depicts a communication system in which the present invention is useful.

FIG. 1 depicts a communication system in which the present invention is useful. This system includes a wireless phone 102, a base station 104, a mobile switching center (MSC) 106, a service control point (SCP) 108, a database 110, and a public switched telephone network (PSTN) 112. The structure and functions of these elements are well-known in the relevant arts. In wireless network 100, base station 104 can be replaced by equivalent structures, such as a cell tower or other wireless receiver, as would be apparent to one skilled in the relevant arts.

Figure 2:
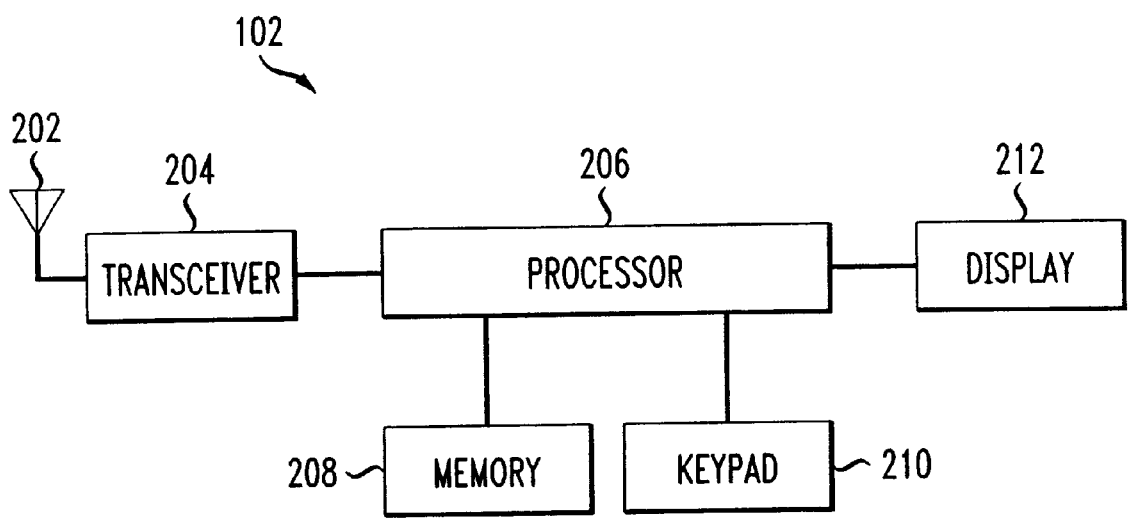
FIG. 2 is a functional block diagram of a wireless phone according to a preferred embodiment.

FIG. 2 is a functional block diagram of wireless phone 102 according to a preferred embodiment. Wireless phone 102 includes an antenna 202, a transceiver 204, a processor 206, a memory 208, a keypad 210, and a display 212. In a preferred embodiment, memory 208 includes two parameters: an electronic serial number (ESN) and one or more mobile identification numbers (MINs).

The ESN uniquely identifies wireless phone 102, as is well known. In conventional systems, the phone is associated with a single MIN. However, in the present invention, the wireless phone is associated with multiple MINs which may have different calling costs under the same circumstances.

Figure 3:
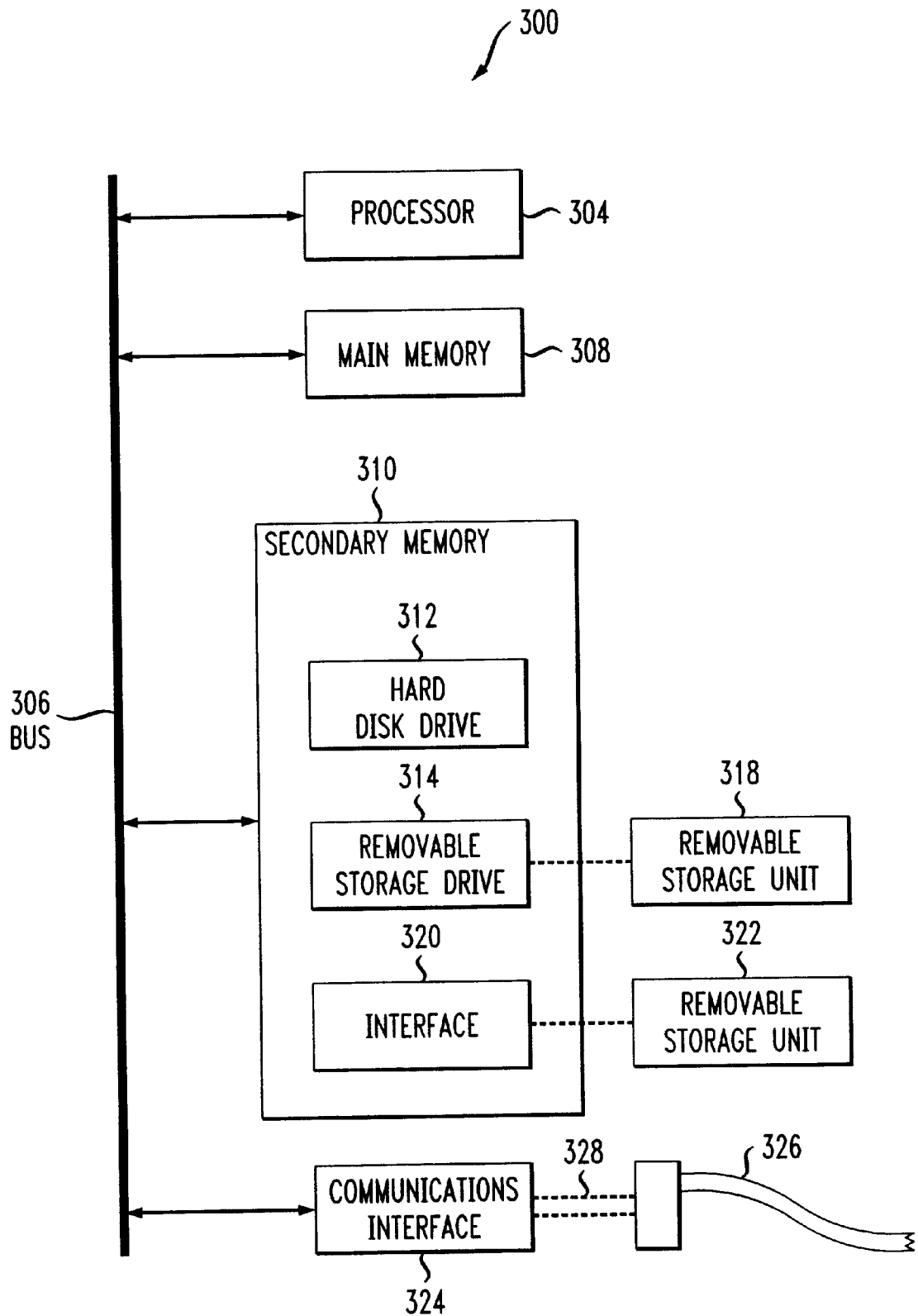
FIG. 3 depicts an exemplary processor which may be used in a wireless phone, mobile switching center, or service control point according to the present invention.

In a preferred embodiment, each of wireless phone 102, MSC 106, and SCP 108 includes a processor. FIG. 3 depicts an exemplary processor which may be used in any of these devices. The functions of these processors may be implemented using hardware, software or a combination thereof and may be implemented in a computer system or other processing system. In fact, in one embodiment, the invention is directed toward one or more computer systems capable of carrying out the functionality described herein. An example computer system 300 is shown in FIG. 3. The computer system 300 includes one or more processors, such as processor 304. The processor 304 is connected to a communication bus 306. Various software embodiments are described in terms of this example computer system. After reading this description, it will become apparent to a person skilled in the relevant art how to implement the invention using other computer systems and/or computer architectures.

Computer system 300 also includes a main memory 308, preferably random access memory (RAM), and can also include a secondary memory 310. The secondary memory 310 can include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well known manner. Removable storage unit 318, represents a floppy disk, magnetic tape, optical disk, etc. which is read by and written to by removable storage drive 314. As will be appreciated, the removable storage unit 318 includes a computer usable storage medium having stored therein computer software and/or data.

In alternative embodiments, secondary memory 310 may include other similar means for allowing computer programs or other instructions to be loaded into computer system 300. Such means can include, for example, a removable storage unit 322 and an interface 320. Examples of such include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 318 to computer system 300.

Computer system 300 can also include a communications interface 324. Communications interface 324 allows software and data to be transferred between computer system 300 and external devices. Examples of communications interface 324 can include a modem, a network interface (such as an Ethernet card), a communications port, a PCM-CIA slot and card, etc. Software and data transferred via communications interface 324 are in the form of signals which can be electronic, electromagnetic, optical or other signals capable of being received by communications interface 324. These signals 326 are provided to communications interface 324 via a channel 328. This channel 328 carries signals 326 and can be implemented using wire or cable, fiber optics, a phone line, a cellular phone link, an RF link and other communications channels.

In this document, the terms "computer program medium" and "computer usable medium" are used to generally refer to media such as removable storage device 318, a hard disk installed in hard disk drive 312, and signals 326. These computer program products are means for providing software to computer system 300.

Computer programs (also called computer control logic) are stored in main memory 308 and/or secondary memory 310. Computer programs can also be received via communications interface 324. Such computer programs, when executed, enable the computer system 300 to perform the features of the present invention as discussed herein. In particular, the computer programs, when executed, enable the processor 304 to perform the features of the present invention. Accordingly, such computer programs represent controllers of the computer system 300.

In an embodiment where the invention is implemented using software, the software may be stored in a computer program product and loaded into computer system 300 using removable storage drive 314, hard drive 312 or communications interface 324. The control logic (software), when executed by the processor 304, causes the processor 304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

Figure 4:
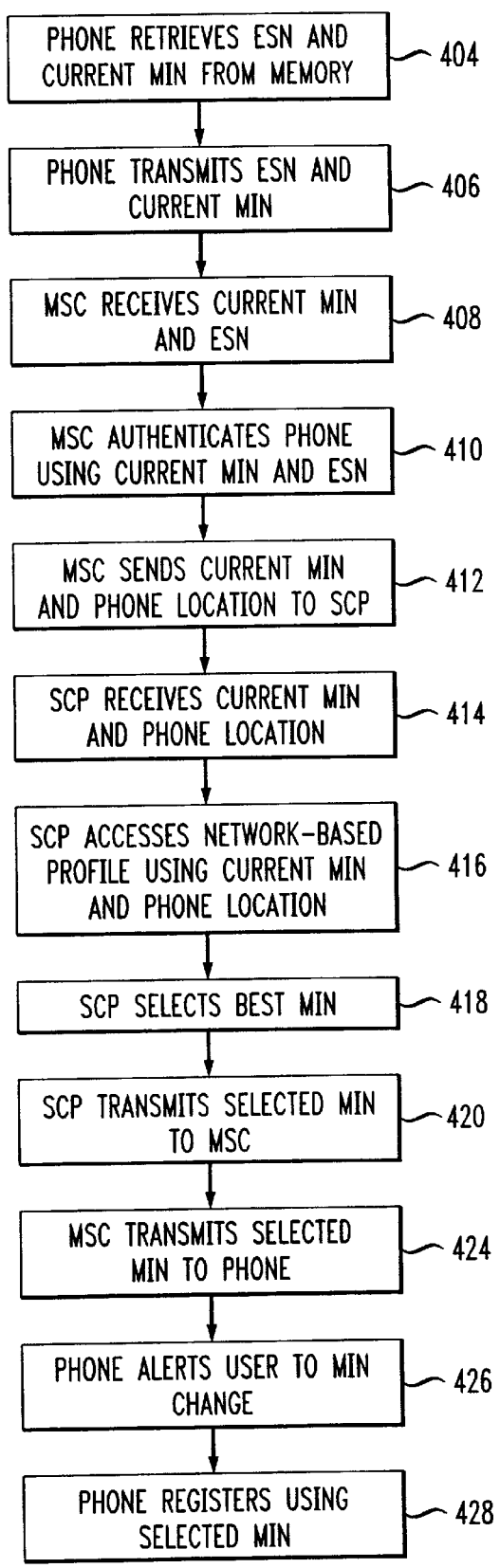
FIG. 4 is a flowchart depicting a registration process according to one embodiment of the present invention.

According to one embodiment of the present invention, wireless phone network 100 selects the MIN that will provide the most cost-effective service for wireless calls to and from wireless phone 102. In a preferred embodiment, this selection takes place during or immediately following a registration process where wireless phone 102 registers with wireless phone network 100. The registration process can be initiated in a number of ways, for example, when the wireless phone is turned on, when a wireless phone that is on moves between wireless service areas, when an inbound call is received, when an outbound call is placed, periodically according to a schedule, or when the profile for the phone is modified. FIG. 4 is a flowchart depicting a registration process according to this embodiment.

When the registration process is initiated, wireless phone 102 retrieves the ESN and the current MIN from memory 208, as shown in step 404, and transmits these parameters to a point in the wireless network, such as wireless base station 104, as shown in step 406. Wireless base station 104 transfers this data to a mobile switching center (MSC), such as MSC 106. MSC 106 receives the ESN and current MIN, as shown in step 408, and authenticates wireless phone 102 using these parameters according to methods well known in the relevant arts, as shown in step 410. MSC 106 sends the current MIN to SCP 108, as shown in step 412. Alternatively, wireless phone 102 can be authenticated by SCP 108.

SCP 108 receives the current MIN, as shown in step 414, and uses the current MIN to access a network-based profile 110 for wireless phone 102, as shown in step 416. Optionally, SCP 108 also receives a location identifier specifying the location of wireless phone 102, the identity of the call service area or wireless base station currently serving wireless phone 102, or the like; in this option, the location identifier is also used to interpret profile 110. In one embodiment, SCP 108 accesses the profile via a TCP/IP network such as the Internet.

Profile 110 contains a plurality of MINs associated with wireless phone 102. The plurality of MINs can include the current MIN. According to one embodiment, profile 110 includes a rate table that specifies wireless calling costs for each MIN. These costs can be based on the location identifier. In another embodiment, the rate table is separate from the profile and the profile points to the rate table. In either embodiment, the rates may be pre-determined or may be computed when the MIN and location identifier are received based on information in the rate table. The determination of calling costs can include such factors as call routing, originating number of an inbound call, terminating number of an outbound call, roaming costs, calling plans, status of calling plans (such as the number of free minutes remaining on a calling plan), temporary rate discounts, and the like, that are associated with each MIN.

The determination can also include consideration of wireline calling costs. For example, the user of wireless phone 102 may have a wireline phone number. The determination can then include the wireline costs of forwarding an inbound call from the wireline number to each MIN when selecting the best MIN. If the best solution includes the use of the wireline number, wireless phone network 100 can automatically activate a call rerouting service, such as call-forwarding or follow-me, to forward calls from the wireline number to the MIN. In this embodiment, the profile includes, points to, or supports computation of these costs.

The determination of calling costs can also consider wireline costs for individual outbound calls. When wireless phone network 100 receives an outbound phone call from wireless phone 102, the dialed number is also used to access profile 110 to determine the wireline costs, such as long-distance charges, associated with each MIN for reaching the dialed number.

Based on this calling cost information, SCP 108 selects the best MIN, as shown in step 418. In a preferred embodiment, the best MIN is the one that provides the lowest wireless calling costs to wireless phone 102. Wireless phone network 100 then transmits an indication of the selected (i.e., best) MIN to wireless phone 102. In one embodiment, wireless phone 102 stores the plurality of MINs; wireless phone 102 uses the indication as a pointer to select the specified stored MIN for use. In another embodiment, SCP 108 transmits the selected MIN to MSC 106, as shown in step 420, which then transmits the selected MIN to wireless phone 102, as shown in step 424.

Of course, the selected MIN may be the same as the current MIN, in which case it is unnecessary to contact wireless phone 102. However, if the selected and current MINs differ, wireless phone 102 may optionally alert the user to the change, as shown in step 426. The alert may take many forms; examples include displaying a message on a screen, flashing a light, beeping, vibrating, broadcasting a spoken message, and the like, or any combination thereof. The messages may include the current and previous MINs and corresponding rates. Wireless phone 102 and wireless phone network 100 thereafter communicate using the selected MIN. Optionally, wireless phone 102 may register with wireless phone network 100 after a change of MIN occurs, as shown in step 428.

Figure 5:
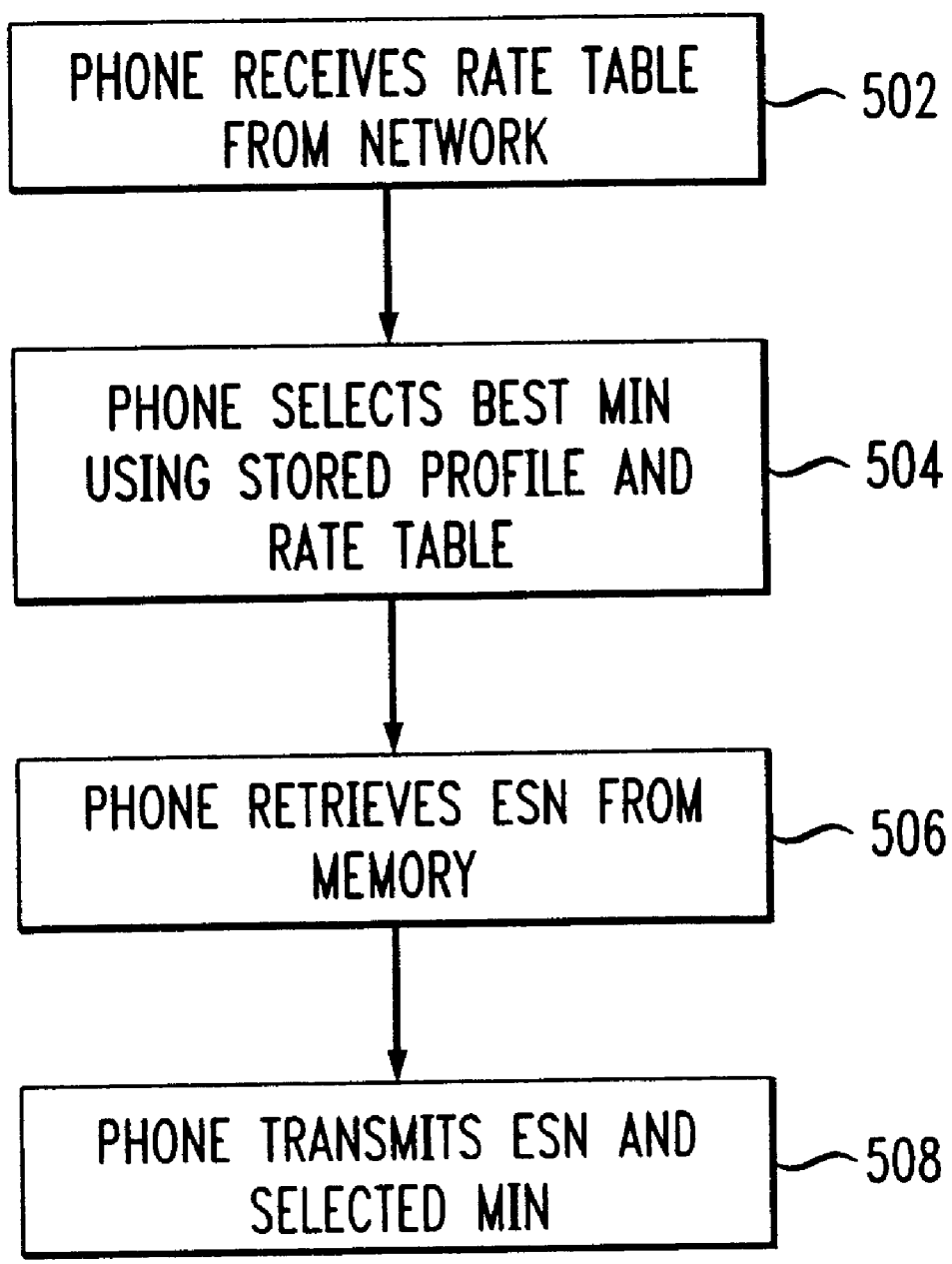
FIG. 5 is a flowchart depicting a process according to a preferred embodiment of the present invention.

According to another embodiment of the present invention, wireless phone 102 selects the MIN that will provide the most cost-effective service for wireless calls to and from wireless phone 102. According to this embodiment, wireless phone 102 includes a profile and rate table similar to those described above. FIG. 5 is a flowchart depicting a process according to this embodiment.

Referring to FIG. 5, wireless phone 102 receives a rate table from wireless phone network 100, as shown in step 502. The rate table can be delivered by methods well-known in the arts, such as cellular digital packet data (CDPD) or short message service (SMS), or by methods yet to be developed. The precise timing and frequency of delivery of the table and table updates can vary according to factors well-known in the relevant arts. When an update is received, or when other factors occur that may affect calling costs, such as reception of a roaming indication or a change in the profile, wireless phone 102 selects the best MIN using the stored profile and the rate table, as shown in step 504.

The profile contains a plurality of MINs associated with wireless phone 102. The plurality of MINs can include the current MIN. The determination of calling costs can include such factors as call routing, originating number of an inbound call, terminating number of an outbound call, roaming costs, calling plans, status of calling plans (such as the number of free minutes remaining on a calling plan), temporary rate discounts, and the like, that are associated with each MIN. The determination can also include consideration of the current service provider when this information is transmitted to wireless phone 102.

The determination can also include consideration of wireline calling costs. For example, the user of wireless phone 102 may have a wireline phone number. The determination can then include the wireline costs of forwarding an inbound call from the wireline number to each MIN when selecting the best MIN. If the best solution includes the use of the wireline number, wireless phone network 100 can automatically activate a call rerouting service, such as call-forwarding or follow-me, to forward calls from the wireline number to the MIN. In this embodiment, the profile includes, points to, or supports computation of these costs.

The determination of calling costs can also consider wireline costs for individual outbound calls. When an outbound phone call is initiated, the dialed number is also used to access the profile to determine the wireline costs, such as long-distance charges, associated with each MIN for reaching the dialed number.

Wireless phone 102 then registers with wireless phone network 100 by retrieving the ESN from memory and transmitting the ESN and selected MIN to wireless phone network 100, as shown in steps 506 and 508. Wireless phone network 100 then authenticates wireless phone 102 using these parameters according to methods well known in the relevant arts.

In a preferred embodiment, the user cannot directly modify the profile stored within wireless phone 102 in order to prevent fraud. Instead, the user may modify the profile by calling his service provider, or using a transaction server connected to the Internet. Once the changes are approved by the service provider, the profile is securely downloaded to wireless phone 102 using methods well-known in the arts, such as cellular digital packet data (CDPD) or short message service (SMS), or by methods yet to be developed.

Of course, the selected MIN may be the same as the current MIN. However, if the selected and current MINs differ, wireless phone 102 may optionally alert the user to the change. The alert may take many forms; examples include displaying a message on a screen; flashing a light, beeping, vibrating, broadcasting a spoken message, and the like, or any combination thereof. The messages may include the current and previous MINs and corresponding rates. Wireless phone 102 and wireless phone network 100 thereafter communicate using the selected MIN. Optionally, wireless phone 102 may register with wireless phone network 100 after a change of MIN occurs, as shown in step 428.

While various embodiments of the present invention have been described above, it should be understood that they have been presented by way of example, and not limitation. It will be apparent to persons skilled in the relevant art that various changes in form and detail can be placed therein without departing from the spirit and scope of the invention. Thus the present invention should not be limited by any of the above-described example embodiments, but should be defined only in accordance with the following claims and their equivalents.

What is claimed is:

1. An apparatus for use in a wireless phone network, the apparatus comprising:

means for receiving a current mobile identification number (MIN) from a wireless phone, the wireless phone associated with a plurality of MINs including the current MIN; and means for selecting one of the plurality of MINs to be used for calls with the wireless phone based on the costs of completing the calls.

2. The apparatus of claim 1, wherein the means for selecting comprises:

means for accessing a network-based profile associated with the current MIN, the profile including the plurality of MINs, each having a calling cost.

3. The apparatus of claim 2, wherein the means for selecting further comprises:

means for computing the calling cost for each of the plurality of MINs based on wireless calling costs.

4. The apparatus of claim 3, further comprising:

means for transmitting an indication of the selected MIN to the wireless phone.

5. The apparatus of claim 4, further comprising:

means for causing the wireless phone to register with the wireless phone network after transmitting the selected MIN.

6. The apparatus of claim 5, wherein the means for transmitting comprises:

means for transmitting the selected MIN to the wireless phone.

7. The apparatus of claim 3, further comprising:

means for receiving an outbound phone call from the wireless phone; and wherein the means for selecting further comprises means for computing the cost of completing the call for each of the plurality of MINs based on wireline calling costs.

8. The apparatus of claim 7, wherein the call is a long-distance call, and wherein the means for selecting further comprises:

means for computing the cost of completing the outbound call for each of the plurality of MINs based on long-distance calling costs.

9. The apparatus of claim 3, wherein the means for selecting further comprises:

means for computing the cost of completing an inbound call to each of the plurality of MINs based on the wireline costs of forwarding the call from a predetermined wireline number.

10. The apparatus of claim 9, further comprising:

means for activating call forwarding of the wireline number to the selected MIN.

11. An apparatus for use in a wireless phone, the apparatus comprising:

means for sending a current mobile identification number (MIN) to a wireless phone network in a call service area, the wireless phone associated with a plurality of MINs;

means for receiving an indication of a selected MIN from the wireless phone network; and means for using the selected MIN for calls with the wireless phone network;

wherein the wireless phone network selects the selected MIN based on the costs of completing the calls.

12. The apparatus of claim 11, wherein the means for receiving comprises:

receiving the selected MIN from the wireless phone network.

13. The apparatus of claim 12, further comprising:

means for registering with the wireless phone network using the selected MIN.

14. The apparatus of claim 13, further comprising:

means for manifesting an indication when the phone changes from one MIN to another.

15. A method for use in a wireless phone network, the method comprising:

receiving a current mobile identification number (MIN) from a wireless phone, the wireless phone associated with a plurality of MINs including the current MIN; and selecting one of the plurality of MINs to be used for calls with the wireless phone based on the costs of completing the calls.

16. The method of claim 15, wherein the selecting step comprises:
accessing a network-based profile associated with the current MIN, the profile including the plurality of MINs, each having a calling cost.

17. The method of claim 16, wherein the selecting step further comprises:
computing the calling cost for each of the plurality of MINs based on wireless calling costs.

18. The method of claim 17, further comprising:
transmitting an indication of the selected MIN to the wireless phone.

19. The method of claim 18, further comprising:
causing the wireless phone to register with the wireless phone network after transmitting the selected MIN.

20. The method of claim 19, wherein the transmitting step comprises:
transmitting the selected MIN to the wireless phone.

21. The method of claim 17, further comprising:
receiving an outbound phone call from the wireless phone; and
wherein the selecting step further comprises computing the cost of completing the call for each of the plurality of MINs based on wireline calling costs.

22. The method of claim 21, wherein the call is a long-distance call, and wherein the selecting step further comprises:
computing the cost of completing the outbound call for each of the plurality of MINs based on long-distance calling costs.

23. The method of claim 17, wherein the selecting step further comprises:
computing the cost of completing an inbound call to each of the plurality of MINs based on the wireline costs of forwarding the call from a predetermined wireline number.

24. The method of claim 23, further comprising:
activating call forwarding of the wireline number to the selected MIN.

25. A method for use in a wireless phone, the method comprising:
sending a current mobile identification number (MIN) to a wireless phone network in a call service area, the wireless phone associated with a plurality of MINs;
receiving an indication of a selected MIN from the wireless phone network; and
using the selected MIN for calls with the wireless phone network;
wherein the wireless phone network selects the selected MIN based on the costs of completing the calls.

26. The method of claim 25, wherein the receiving step comprises:
receiving the selected MIN from the wireless phone network.

27. The method of claim 26, further comprising:
registering with the wireless phone network using the selected MIN.

28. The method of claim 27, further comprising:
manifesting an indication when the phone changes from one MIN to another.

29. A computer program product for use in a wireless phone network, the computer program product comprising a computer usable medium having computer readable program code means embodied in said medium, said computer readable program code means comprising:
first computer readable program code means for causing a computer to receive a current mobile identification number (MIN) from a wireless phone, the wireless phone associated with a plurality of MINs including the current MIN; and
second computer readable program code means for causing the computer to select one of the plurality of MINs to be used for calls with the wireless phone based on the costs of completing the calls.

30. The computer program product of claim 29, wherein the second computer readable program code means comprises:
computer readable program code means for causing the computer to access a network-based profile associated with the current MIN, the profile including the plurality of MINs, each having a calling cost.

31. The computer program product of claim 30, wherein the second computer readable program code means further comprises:
computer readable program code means for causing the computer to compute the calling cost for each of the plurality of MINs based on wireless calling costs.

32. The computer program product of claim 31, further comprising:
computer readable program code means for causing the computer to transmit an indication of the selected MIN to the wireless phone.

33. The computer program product of claim 32, further comprising:
computer readable program code means for causing the computer to cause the wireless phone to register with the wireless phone network after transmitting the selected MIN.

34. The computer program product of claim 33, wherein the computer readable program code means for causing the computer to transmit comprises:
computer readable program code means for causing the computer to transmit the selected MIN to the wireless phone.

35. The computer program product of claim 31, further comprising:
computer readable program code means for causing the computer to receive an outbound phone call from the wireless phone; and
wherein the second computer readable program code means further comprises computer readable program code means for causing the computer to compute the cost of completing the call for each of the plurality of MINs based on wireline calling costs.

36. The computer program product of claim 35, wherein the call is a long-distance call, and wherein the second computer program code means further comprises:
computer readable program code means for causing the computer to compute the cost of completing the outbound call for each of the plurality of MINs based on long-distance calling costs.

37. The computer program product of claim 31, wherein the second computer readable program code means further comprises:
computer readable program code means for causing the computer to compute the cost of completing an inbound call to each of the plurality of MINs based on the wireline costs of forwarding the call from a predetermined wireline number.

38. The computer program product of claim 37, further comprising:
   computer readable program code means for causing the computer to activate call forwarding of the wireline number to the selected MIN.

39. A computer program product for use in a wireless phone, the computer program product comprising a computer usable medium having computer readable program code means embodied in said medium, said computer readable program code means comprising:
   first computer readable program code means for causing a computer to send a current mobile identification number (MIN) to a wireless phone network in a call service area, the wireless phone associated with a plurality of MINs;
   second computer readable program code means for causing a computer to receive an indication of a selected MIN from the wireless phone network; and
   third computer readable program code means for causing a computer to use the selected MIN for calls with the wireless phone network;
   wherein the wireless phone network selects the selected MIN based on the costs of completing the calls.

40. The computer program product of claim 39, wherein the second computer readable program code means comprises:
   computer readable program code means for causing a computer to receive the selected MIN from the wireless phone network.

41. The computer program product of claim 40, further comprising:
   computer readable program code means for causing a computer to register with the wireless phone network using the selected MIN.

42. The computer program product of claim 41, further comprising:
   computer readable program code means for causing a computer to manifest an indication when the phone changes from one MIN to another.

* * * * *